No. 673,809. Patented May 7, 1901.
W. O. WORTH.
GAS ENGINE.
(Application filed July 1, 1899.)
(No Model.) 5 Sheets—Sheet 1.
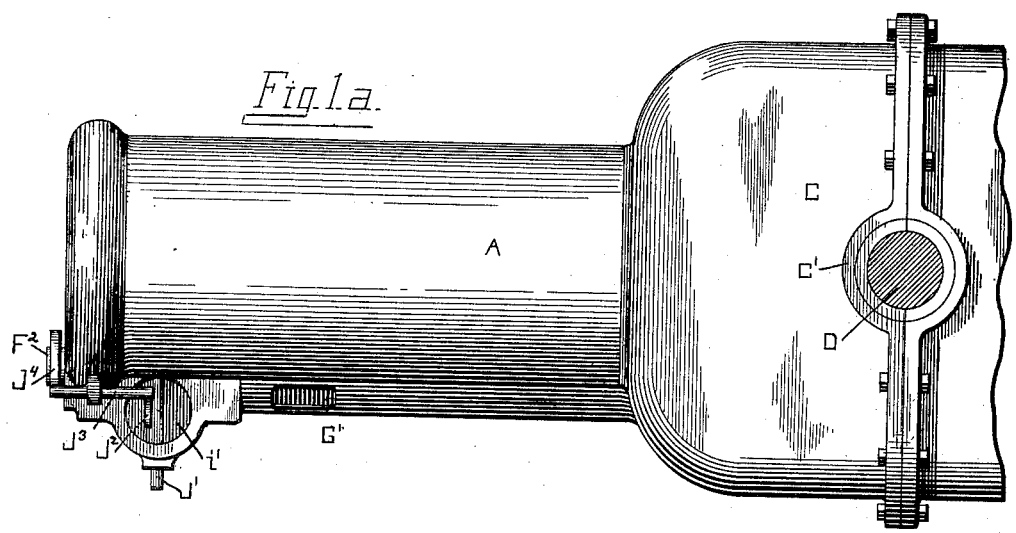
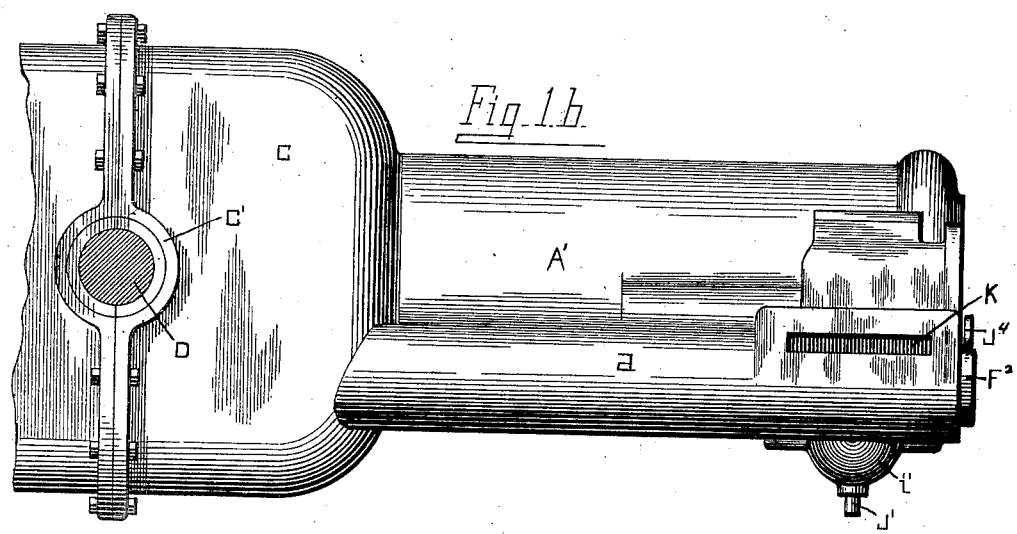

No. 673,809. Patented May 7, 1901.
W. O. WORTH.
GAS ENGINE.
(Application filed July 1, 1899.)
(No Model.) 5 Sheets—Sheet 3.

Witnesses:
Inventor:
William O. Worth
By Alexander & Dowell
Attorneys.

No. 673,809. Patented May 7, 1901.
W. O. WORTH.
GAS ENGINE.
(Application filed July 1, 1899.)
(No Model.) 5 Sheets—Sheet 4.

UNITED STATES PATENT OFFICE.

WILLIAM O. WORTH, OF CHICAGO, ILLINOIS, ASSIGNOR OF TWO-THIRDS TO WILLIAM R. DONALDSON, OF LOUISVILLE, KENTUCKY, AND HENRY W. KELLOGG, OF BATTLECREEK, MICHIGAN.

GAS-ENGINE.

SPECIFICATION forming part of Letters Patent No. 673,809, dated May 7, 1901.

Application filed July 1, 1899. Serial No. 722,564. (No model.)

*To all whom it may concern:*

Be it known that I, WILLIAM O. WORTH, of Chicago, in the county of Cook and State of Illinois, have invented certain new and useful Improvements in Gas-Engines; and I hereby declare that the following is a full, clear, and exact description thereof, reference being had to the accompanying drawings, which form part of this specification.

This invention relates to gas or explosive engines; and its principal object is to make an explosive-engine which can run without water or other liquid cooling medium. This object is attained, perhaps principally, by the peculiar method of operating the engine, as well as by its peculiar construction.

A secondary object is to improve the construction of the engine and of its valves, so that the principal object aforesaid can be practically realized and the engine operated indefinitely at high speed with perfect safety.

It is known, of course, that any gas-engine can be operated a few strokes without water; but soon the cylinders become so hot that the gases are fired or exploded as they are admitted therein. This defect or disadvantage appertains to every gas-engine heretofore constructed, so far as I am aware, unless some extrinsic cooling device for the cylinder is employed, which is usually a water-jacket, notwithstanding the fact that a gas-engine capable of operating without water has been long wanted and many attempts to provide a practical engine of this nature made.

In the accompanying drawings I have illustrated what I now consider the best form of gas-engine embodying the present invention, and therein—

Figure 2:
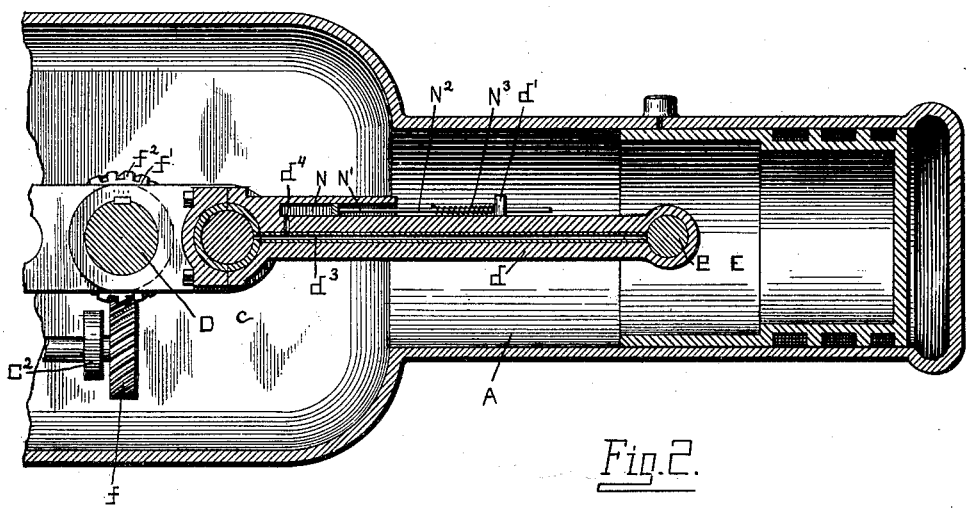
Figure 3:
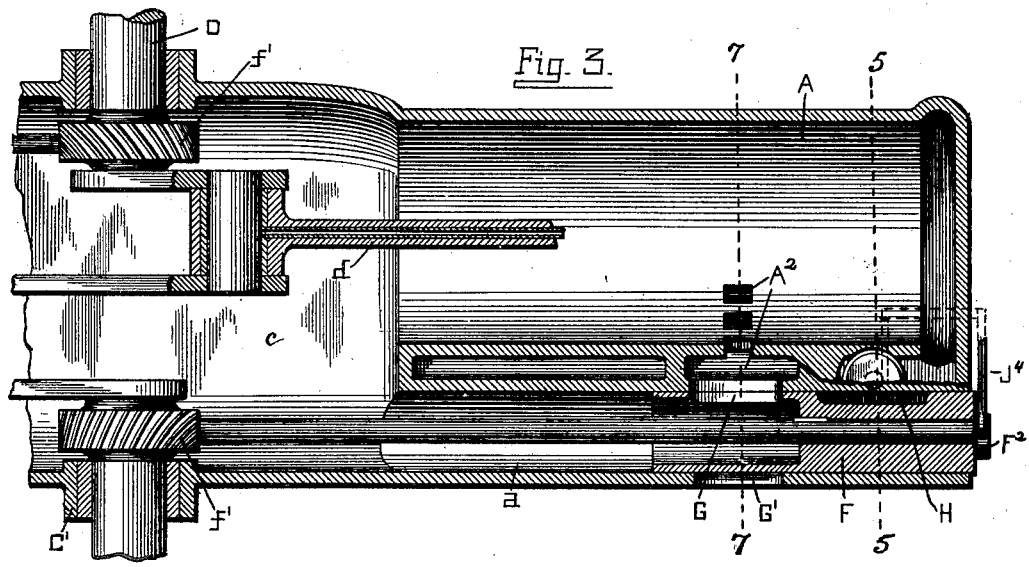
Figure 4:
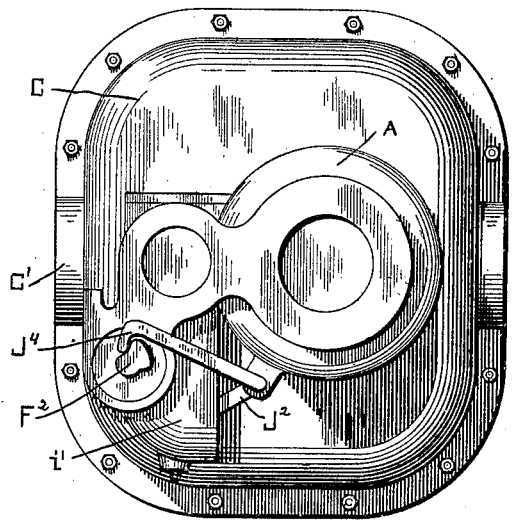
Figure 5:
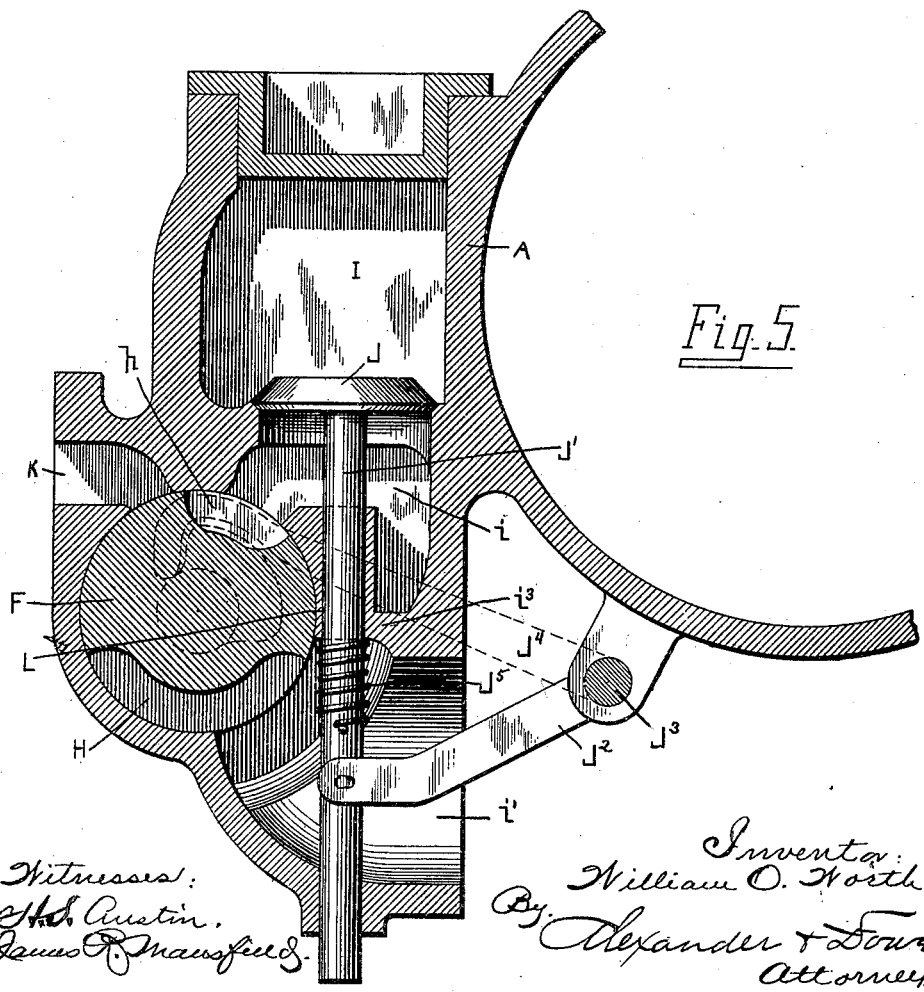
Figure 6:
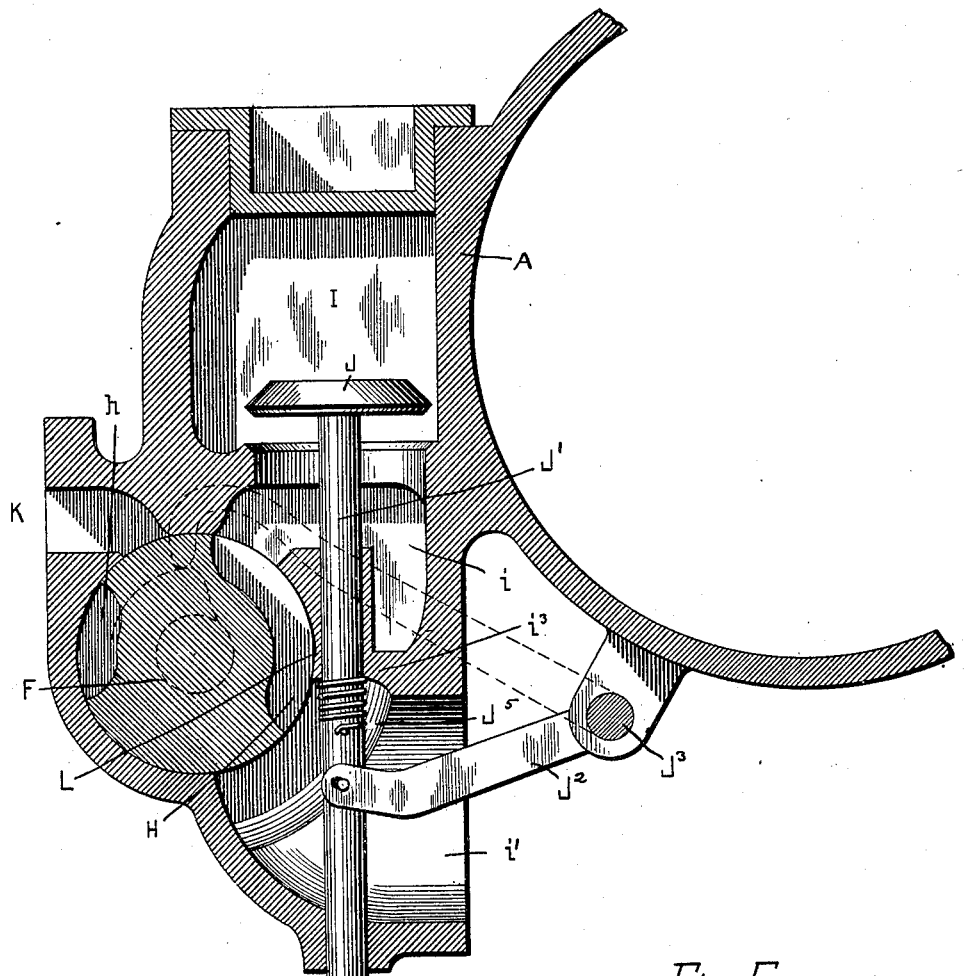
Figure 7:
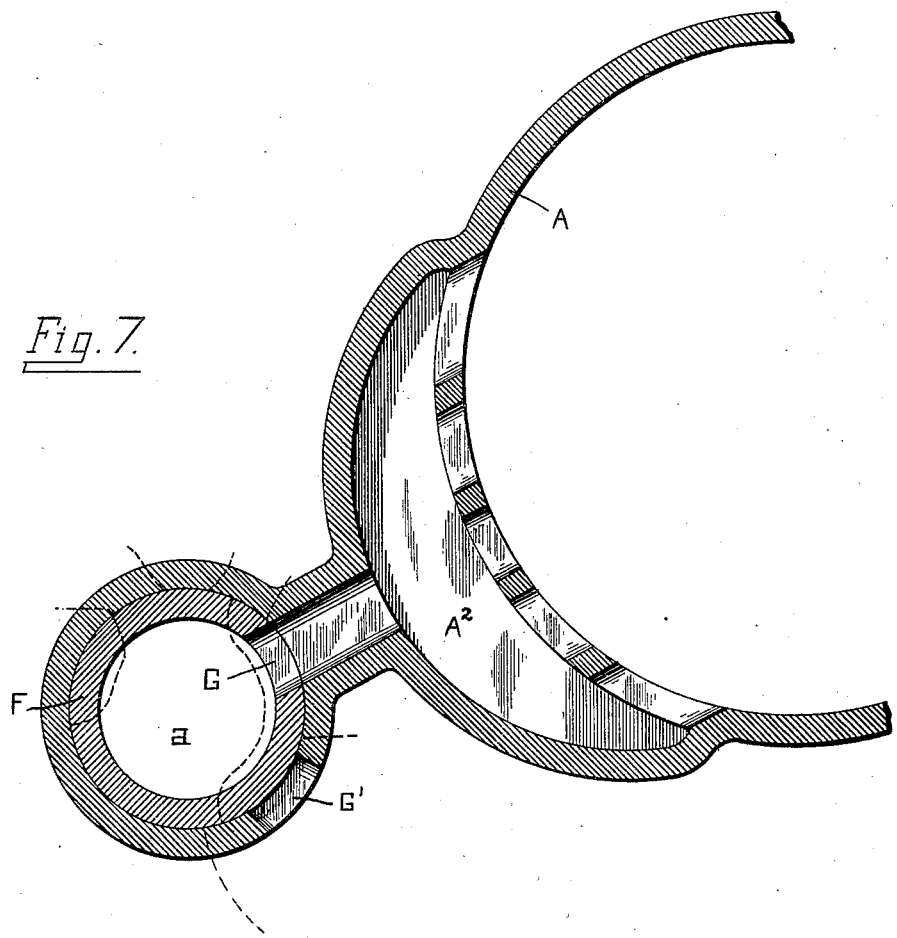
Figure 8:
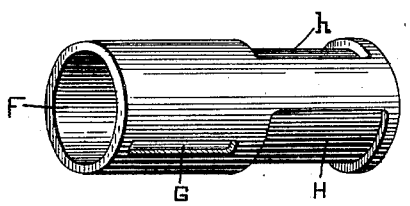

Figures 1$^a$ and 1$^b$ represent side elevations of the engine. Fig. 2 is an enlarged vertical section through one end of the engine. Fig. 3 is a horizontal section. Fig. 4 is an end elevation. Fig. 5 is an enlarged transverse section on line 5 5, Fig. 3. Fig. 6 is a similar section showing the valve in a different position from that in Fig. 5. Fig. 7 is a section on line 7 7, Fig. 3. Fig. 8 is a perspective view of the valve.

The engine comprises two diametrically-opposed cylinders A A', supported on or formed with a casting C, having bearings C' for the transverse main shaft D, which has opposite cranks one hundred and eighty degrees apart, respectively directly connected by pitmen $d$ to the pistons E in cylinders A A', as shown. The pitmen are hinged to the pistons by bolts $e$, as shown. The journals of the pitmen on the crank-shaft and cylinders are lubricated by the means shown in Fig. 2, which consists of a lubricant-holder N, formed on top of the piston and communicating by a passage $d^4$ with a longitudinal passage $d^3$ in the piston, by which the lubricant is fed to the journals. The lubricant is placed in the holder and gradually forced out of it and through the passages by the spring-pressed piston N', the rod N² of which projects through a lug $d'$ on top of the piston, and a stout spring N³ is placed on the rod between piston N' and lug $d'$. The casing is made practically air-tight, and its interior forms an air-pumping chamber $c$, directly communicating with the open inner ends of the cylinders, the pistons E E' forming both the working and pumping pistons. The cranks being one hundred and eighty degrees apart, the pistons simultaneously move inward, thus compressing the air in the crank-chamber, which is utilized as hereinafter explained, and when the pistons separate fresh air is sucked into the crank-chamber by means of suitably-valved ports.

Parallel with and beside each cylinder A A' is a main valve-chamber $a\ a'$, within which are fitted rotary valves F F', which are rotated by means of screw-gears $f$ on the inner ends of the valve-rods, which are journaled in brackets C². These gears $f$ are meshed by the lateral teeth $f^2$ of screw-gears $f'$, fixed on the main shaft, as indicated in Figs. 2 and 3, these gears $f\ f'$ being so proportioned that valves F are rotated but once for each two revolutions of shaft D. As each cylinder and its ports and valves are arranged and constructed alike, I will describe the construction and arrangement of one only, similar letters of reference on the drawings indicating similar parts. Each valve has a longitudinal circumferential port G in its inner end, which is adapted at one time to register with an air-inlet port G' in the outer side of the valve-casing, and thus admit air into the crank-chamber, and at another time to register with an air-inlet $A^2$ in the side of the cylinder and allow air to enter the cylinder from the crank-chamber. In the outer end or portion of the valve are diametrically opposite ports h H, which control the inlet of the explosive mixture and the outlet of burned gases, and the arrangement of port for such explosive and burned gases is best shown in Figs. 5 and 6. In the drawings it will be seen that there is an igniting-chamber I communicating with the end of the cylinder and separated from the valve-chamber by a pop-valve J, arranged on a stem J', which depends between the valve-chamber and cylinder, being suitably guided in the valve-chamber casing, as shown, and operated as hereinafter explained. The outlet-passage $i$ from chamber I to the exhaust $i'$ is blocked by valve F, and the gas-inlet K is also blocked by valve F; but communication is established alternately between the inlet K and passage $i$ and between said passage and the exhaust $i'$ by means of ports h H. When the valve is in one position, port h registers with K and $i$ and (valve J having been previously opened) gas is admitted into the explosion chamber and cylinder. No igniting mechanism is shown; but any suitable kind may be employed. During another part of the revolution of valve F port H establishes communication between passage $i$ and exhaust $i'$, valve J being kept open during this time.

It will be noticed, perhaps, that port h extends only about one-eighth around the periphery of the valve, while port H extends a third or more around it. The face L of the partition $i^3$, which is interposed between passage $i$ and exhaust $i'$, is of such extent that port h cannot establish communication between $i$ and $i'$. Port K being diametrically opposite exhaust $i'$, port H cannot establish communication therebetween at any time, although there would be no serious disadvantage in its so doing.

The pop-valve J is opened at the proper times by means of an arm $J^2$ on a rock-shaft $J^3$, journaled in suitable supports parallel with but exterior to valve F and having an arm $J^4$ on its other end adapted to be engaged by a cam $F^2$ on the exterior end of valve F, as shown in Figs. 4, 5, and 6. A spring $J^5$ may be arranged to seat valve J quickly, it being seated by the pressure within the cylinder, however.

The operation is as follows: Each piston makes four strokes (two reciprocations) for each explosion in its cylinder—that is, it makes one direct driven stroke and three idle strokes. The explosions take place alternately, however, in opposite cylinders—say first in cylinder A and then in cylinder A'— and these explosions are so timed that the third stroke of each piston is due to the direct driven stroke of the other piston, the action of the pistons upon the main shaft being substantially similar to that of a single-acting engine. Presuming the engine to be in position with pistons at the outermost ends of their strokes and a charge of gas just exploded in cylinder A, this drives piston E inward, and the air in the crank-chamber is compressed therein, because the valves F are then in such position that the air cannot escape therefrom. When piston E reaches the end of its inner stroke, its pop-valve J is unseated, and simultaneously port H in valve F establishes communication between passage $i$ and exhaust $i'$, so that the burned gases escape instantly. A moment later the port G in valve F registers with port $A^2$ in cylinder A, and the compressed air from the crank-chamber rushes into cylinder A, expelling the remaining burned gases and reducing the temperature thereof, the exhaust-ports remaining open during the first back stroke of piston E. As the pistons start back, however, valve F closes port $A^2$; but the port G in valve F' communicates with its port G' and allows air to flow into the crank-chamber. At the beginning of the second inward stroke of piston E valve F registers port h with ports K and $i$ (valve J being held open) and the explosive mixture is sucked into cylinder A until piston E has moved about a third inward, when the gas-inlet is closed, and as no other gas or air can enter obviously the explosive mixture in the cylinder is attenuated and expanded during the remainder of this stroke of the piston. I prefer to admit the gaseous mixture through port K under atmospheric or very low pressure, so that it will be necessarily expanded and attenuated in the cylinder during the second inward stroke of the piston. Valve J remains closed, so that upon the second outward stroke of the piston the attenuated gases are confined therein, and after they are restored to normal condition they are compressed during the last part of the second outward stroke of the piston and fully compressed at the end of such stroke, whereupon they are ignited and drive the piston inward again, this cycle of operations being repeated for each four strokes of the piston E. Identically the same cycle of operations is repeated in cylinder A', only that the explosions in cylinder A alternate with those in A', the valves F being so set relatively to each other as to effect the proper alternate action of the pistons. The air compressed in the crank-chamber by the inward movement of the pistons is admitted alternately into cylinders A A', just after the explosion-strokes therein.

It will be noted that while the explosive gases are compressed only during about a third of the stroke of the piston they expand when exploded for the full stroke thereof and the burned gases are exhausted from the cylinder during a full stroke. This enables me to utilize the working pressure of the exploded gases to the utmost capacity of the engine and to exhaust them at as low pressure as five pounds, whereas generally they are exhausted at a pressure of from thirty-five to fifty pounds and upward. This low pressure and long exhaust renders the engine almost noiseless in its operation and peculiarly adapted for use on motor-vehicles and in places where the noise of the ordinary engines would be objectionable. Because of this long expansion of the exploded gases and the low resultant pressure the heat of the cylinder is kept down or kept much lower than in ordinary gas-engines, and, further, because of the small compression or exploding chamber required for the compressed explosive gases the low heat produced is confined almost entirely to the working end of the cylinder.

From the foregoing it will be seen that the method of operating the engine is peculiar, first, in that the explosive gases are admitted into the cylinder, closed in but expanded, and then compressed and exploded, this method being capable of utilization in single-cylinder and single or double acting machines, and second, in that the opposite cylinders make only one workingstroke in two reciprocations.

By shutting off the admission of gas at about a third of the stroke and expanding the gas confined in the cylinder during the remainder of such stroke the gas is not compressed until after the piston has made, say, two-thirds of its return stroke, and thus there is no resistance to overcome until the piston and cranks are in the most advantageous working position, and I can therefore utilize a much smaller compression-chamber and compress the gas more highly than is possible in engines working in the ordinary manner. The higher pressure of gas results in a more powerful explosion, and at the same time less nitrogen gas is produced in the cylinder, so that the engine is very economical and efficient and the cylinder is kept at more moderate temperature. The large volume of air forced into the cylinder and through the cylinder after each explosion should be sufficient to thoroughly clear it of nitrogen and inert gases, so that the explosive gas would not be weakened or diluted by such gases, and therefore would be more powerful when exploded. This method of operation is therefore advantageous both on the score of economy and efficiency.

While I have found that admission of explosive gases for only a third of the piston-stroke is very effective, I do not intend to confine myself to any particular part or fraction of the stroke, and the engines may be made with variable cut-offs. Neither do I restrict myself to the particular apparatus herein described for utilizing my method of working gas-engines, nor to the particular construction of such apparatus. The same, however, is an effective waterless antiheating gas-engine capable of indefinitely operating without premature explosions.

Having thus described my invention, what I therefore claim as new, and desire to secure by Letters Patent thereon, is—

1. The combination of the cylinder, and a passage communicating with one end thereof, and gas inlet and exhaust ports communicating with said passage; with a valve constructed to successively establish communication between the gas-inlet and said passage, and between said passage and the exhaust, a pop-valve for closing communication between said passage and cylinder, and means for opening said pop-valve when the first valve establishes communication between the gas inlet or outlet port and said passage, for the purpose and substantially as described.

2. The combination, in a gas-engine, of the cylinder, its piston, the gas inlet and exhaust ports communicating with one end of the cylinder, and an air-inlet port at the other end of the cylinder; with a valve constructed to first simultaneously open the air-port and exhaust-port, then to close said ports and open the gas-inlet port, and finally to keep all said ports closed during the explosion-stroke, for the purpose and substantially as described.

3. In a gas-engine, the combination of the cylinder, its piston, an air-inlet port at one end of the cylinder, a passage at the other end of the cylinder communicating therewith, and gas inlet and exhaust ports communicating with said passage; with a single valve constructed to simultaneously open said air inlet and exhaust ports, then to close them and open the gas-inlet port, for the purpose and substantially as described.

4. In a four-cycle gas-engine, the combination of the cylinder having air-inlet port at one end and gas inlet and exhaust ports at the other end, a piston, and a rotary valve constructed substantially as described, to close the air and exhaust ports and open the gas-inlet port at the beginning of one forward stroke of the piston, then to close said inlet-port during such stroke of the piston and its next return stroke, and keep all said ports closed during the succeeding forward or third stroke, and then to open the exhaust and air inlet ports at the end of the third stroke, and to close the air-exhaust ports at the end of the third stroke, and open the gas-inlet port, all substantially as and for the purpose described.

5. The combination of the cylinder having an inlet-passage, inlet and exhaust ports communicating with said passage and the rotary valve controlling said ports; with a pop-valve interposed between said cylinder and passage, the rock-shaft and levers for operating said pop-valve, and a cam on said rotary valve for operating said rock-shaft, for the purpose and substantially as described.

6. In a gas-engine, the combination of the opposite cylinders, their pistons, an intermediate-crank-shaft chamber in which air is compressed by the pistons, and a valve beside each cylinder constructed to alternately establish communication between the atmosphere and the crank-chamber, and between the crank-chamber and the cylinders alternately, for the purpose and substantially as described.

7. In a gas-engine, the combination of opposite cylinders, their pistons, and the crank-shaft to which the pistons are connected, the inlet and exhaust ports for each cylinder, and a rotary valve beside each cylinder constructed to alternately open and close said ports, said ports and valves being so arranged and operated that the inlet-port of each cylinder is open only during part of one stroke of its piston, then closed during the remainder of such stroke and during the three successive strokes, and the exhaust-port is open only during the fourth stroke of the cylinder, substantially as and for the purpose described.

8. In a gas-engine, the combination of the opposite cylinders, their pistons, an intermediate-crank-shaft chamber in which air is compressed by the pistons, and a valve beside each cylinder constructed to alternately establish communication between the atmosphere and the crank-chamber, and between the crank-chamber and the cylinders alternately; with gas inlet and exhaust ports in the outer ends of the cylinder, and a rotary valve beside each cylinder adapted to alternately open and close said ports; said ports and valves being so arranged that the gas-inlet port of each cylinder is opened only during part of the first stroke of its piston, then closed during the remainder of such stroke and for the next three strokes, and the exhaust-port is open only during the fourth stroke of the piston and when the air-port is open, for the purpose and substantially as described.

9. The combination, in a gas-engine, of the opposite cylinders, the oppositely-moving pistons therein, the intermediate crank-shaft, and the crank-chamber between the cylinders but communicating with the inner open ends thereof, whereby said pistons simultaneously compress air in said crank-chamber on one stroke, and suck it therein on the next stroke; with gas inlet and outlet ports for each cylinder at one end thereof, an air-inlet port for each cylinder at the inner end thereof, and a single rotary valve beside each cylinder, said valve having one port constructed to alternately establish communication between the exterior atmosphere and the crank-chamber, and between the crank-chamber and air-inlet port of piston, and said valve having other ports constructed to alternately establish communication between the gas-inlet port and cylinder, and between the exhaust-port and cylinder, all substantially as and for the purpose set forth.

10. In a gas-engine, the combination of the opposite cylinders, their pistons, the crank-shaft connected to said pistons, the air-compressing chamber around the crank-shaft, the air-inlet ports at the inner ends of the cylinders, and the gas inlet and outlet ports for said cylinders, at their outer ends; with similar rotary valves one for each cylinder each constructed to control all the ports of each cylinder, and gearing whereby said valves are rotated but once for each two revolutions of the crank-shaft, all so arranged that each piston makes four strokes for one explosion in its cylinder, all substantially as and for the purpose described.

11. The herein-described gas-engine consisting of the opposite cylinders, the crank-shaft air-compression chamber, the crank-shaft, the pistons in the cylinders connected to said crank-shaft, the air-inlet port for each cylinder, a passage communicating with each cylinder, the gas and exhaust ports in said passage, and the pop-valve closing said passage; with the compound rotary valve beside each cylinder constructed to control communication between the atmosphere and the crank-chamber, between the crank-chamber and cylinder, between the gas-inlet and said passage and between the gas-exhaust and said passage, a cam on said valve and levers operated by said cam for operating the pop-valves, all substantially as and for the purpose set forth.

12. In a four-cycle gas-engine, the combination of the working and pump cylinder, the gas inlet and outlet ports and air-inlet port, a valve-chamber beside said cylinder communicating with all said ports, and a rotary valve in said chamber constructed to properly open and close all of said ports during one rotation; with the piston in said cylinder, the crank-shaft rotated by said piston, and means whereby said valve is turned only once for every two revolutions of the crank-shaft, all substantially as and for the purpose described.

13. The combination in a gas-engine, of the opposite cylinders, the gas inlet and outlet ports thereof, and air-inlet ports thereof, the oppositely-moving pistons therein, the intermediate crank-shaft, and the closed crank-chamber between the cylinders communicating with the inner open ends thereof, whereby said pistons simultaneously compress air in said crank-chamber on one stroke, and suck it therein on the next stroke, passages leading from said crank-chamber to the air-inlet ports of the opposite cylinders, and the rotary valves operated from said crank-shaft, constructed to control all the ports of both cylinders, for the purpose and substantially as described.

14. In a gas-engine, the combination of a pair of opposite open-ended cylinders, an intermediate closed crank chamber or casing, the pistons in said cylinders, and means for simultaneously moving the pistons in opposite directions, whereby they simultaneously compress the air in said chamber; with the air-inlets, passages leading from said crank-chamber to the opposite cylinders, and the rotary valves operated from said crank-shaft, whereby the compressed air is alternately admitted into the opposite cylinders, for the purpose and substantially as described.

15. In a gas-engine, the combination of opposite cylinders, an intermediate closed crank-chamber communicating with both cylinders, the crank-shaft, the pistons connected to cranks on said shaft and adapted to compress air in said crank-chamber, and the air and gas inlets to the cylinders; with a rotary valve for each cylinder constructed to control both the air and gas inlets, and mechanism substantially as described whereby the valves are rotated so as to admit gas to each cylinder only once for two reciprocations or four strokes of its piston, and whereby the compressed air is admitted from said crank-chamber into each cylinder after each explosion therein to purge it of burned gases, for the purpose and substantially as described.

In testimony that I claim the foregoing as my own I affix my signature in presence of two witnesses.

WILLIAM O. WORTH.

In presence of—
 B. P. DONNELLY,
 W. R. DONALDSON.